Patented May 24, 1949

2,470,763

UNITED STATES PATENT OFFICE 2,470,763

FLUX COATED ALUMINUM ROD FOR GAS WELDING

Dorris Monell Doyle, Springfield, Pa.

No Drawing. Application September 13, 1946, Serial No. 696,958

3 Claims. (Cl. 148—26)

(Granted under the act of March 3, 1883, as amended April 30, 1928; 370 O. G. 757)

This invention relates to an aluminum gas-welding rod, and to a flux composition to be used in aluminum gas welding.

It is an object of this invention to provide an improved flux composition for the gas welding of aluminum.

Another object is to provide an improved aluminum gas-welding rod.

A further object is to provide a non-corrosive flux composition for the gas welding of aluminum.

Further objects and advantages of this invention, as well as its composition and utilization, will be apparent from the following description and claims.

The flux of this invention comprises essentially a mixture of at least two alkali-metal fluorides and at least one alkaline-earth fluoride. The fluorides utilized are relatively water-insoluble, and preferably of relatively low melting point. The alkali-metal fluorides constitute a major proportion of the mixture, desirably 60% to 90% by weight, the remainder constituting an alkaline-earth fluoride or a mixture of alkaline-earth fluorides.

By way of example, a composition for an aluminum-gas-welding flux of especially desirable properties can be prepared by admixture of two parts by weight of lithium fluoride, two parts by weight of sodium fluoride, and one part by weight of calcium fluoride. The fluorides are preferably used in powdered or pulverized form, and combined by mechanical admixture. This composition constitutes four parts by weight of a mixture of two alkali-metal fluorides and one part by weight of an alkaline-earth fluoride, the mixture melting at a temperature of substantially 550° C.

The above fluoride composition, being relatively water-insoluble, can be made into a thick paste after thorough admixture by the addition of water, and the paste applied to aluminum gas-welding rods by any conventional procedure, such as dipping, brushing, or extrusion. The coated rods can then be dried by the evaporation of excess water at room temperature, followed by drying in an oven at moderate temperatures, about 250° C. being suitable. If desired, a binder such as alkali silicate can be added to the paste composition before it is applied to the aluminum rods.

Aluminum structures can be welded with the aluminum gas-welding rods prepared as above described according to standard gas-welding practices. The welding rods of this invention permit high welding speeds, and the flux composition used therein has substantially no corrosive effect on the metal being welded. The flux composition of this invention has properties that make it highly suitable for aluminum gas welding, including low melting point and solvent action on aluminum oxide. The flux composition yields a slag that is fusible, highly fluid while liquid, and friable and easily cleaned after solidification. The slag is non-corrosive to aluminum and is conducive to sound weld metal.

The powdered mixture of water-insoluble fluorides is non-deliquescent, and may be easily stored in powdered form without the formation of lumps that would interfere with the making of smooth pastes by the addition of water. Small amounts of other materials may be added to the flux composition to alter the welding characteristics thereof as desired.

Modifications and changes can be made in the above exemplification of this invention without departing from the spirit and scope of this invention.

The invention described herein may be manufactured and used by or for the Government of the United States of America for governmental purposes without the payment of any royalties thereon or therefor.

What is claimed is:

1. A flux composition comprising about 40% of lithium fluoride, about 40% of sodium fluoride, and about 20% of calcium fluoride.

2. A flux composition for use in welding aluminum consisting of about 40% of lithium fluoride, about 40% of sodium fluoride, and about 20% of calcium fluoride.

3. A welding rod comprising a core consisting principally of aluminum and a flux coating on said core, said flux coating comprising about 40% of lithium chloride, about 40% of sodium fluoride, and about 20% of calcium fluoride.

DORRIS MONELL DOYLE.

REFERENCES CITED

The following references are of record in the file of this patent:

UNITED STATES PATENTS

| Number | Name | Date |
|---|---|---|
| 1,946,958 | Anastasiadis | Feb. 13, 1934 |
| 2,112,578 | Rohrig | Mar. 29, 1938 |
| 2,179,258 | Howarth | Nov. 7, 1939 |
| 2,337,714 | Haim et al. | Dec. 28, 1943 |

FOREIGN PATENTS

| Number | Country | Date |
|---|---|---|
| 560,636 | Great Britain | Apr. 13, 1944 |